United States Patent
French et al.

(10) Patent No.: US 6,391,093 B1
(45) Date of Patent: May 21, 2002

(54) WELDING FILTRATION SYSTEM

(75) Inventors: Scott Howard French, Rockford; John E. McManus, Jr., Spring Lake, both of MI (US); Bimal B. Patel, Streetsboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/490,375

(22) Filed: Jan. 24, 2000

(51) Int. Cl.[7] .............................................. B01D 47/02
(52) U.S. Cl. .......................... 95/226; 95/214; 95/230; 95/234; 95/23; 95/24; 96/245; 96/252; 96/259; 96/351; 96/353; 96/361
(58) Field of Search .................... 96/245, 247, 249, 96/250, 252, 255, 257, 258, 259, 329, 351, 352, 353, 354, 361, 363, 364, 264; 95/149, 214, 226, 230, 234, 1, 23, 24; 55/385.1, 385.2, 267

(56) References Cited

U.S. PATENT DOCUMENTS

| | | | | |
|---|---|---|---|---|
| 4,083,704 A | * | 4/1978 | Knopf | 96/351 |
| 4,162,390 A | * | 7/1979 | Kelly | 219/121.63 |
| 4,358,300 A | * | 11/1982 | Schlapman et al. | 96/330 |
| 4,372,760 A | * | 2/1983 | Van Zantwyk | 96/247 |
| 4,659,901 A | * | 4/1987 | Rieben | 219/121.63 |
| 4,874,404 A | * | 10/1989 | Boswell | 96/353 |
| 4,906,261 A | * | 3/1990 | Mohajer | 96/351 |
| 5,034,038 A | * | 7/1991 | Olson | 96/249 |
| 5,075,922 A | * | 12/1991 | Tsuchida et al. | 15/339 |
| 5,078,759 A | * | 1/1992 | Kira | 96/352 |
| 5,145,106 A | * | 9/1992 | Moore et al. | 228/234.3 |
| 5,192,344 A | * | 3/1993 | House | 96/247 |
| 5,395,408 A | * | 3/1995 | Zeritis | 96/255 |
| 5,833,867 A | * | 11/1998 | Hensley | 210/792 |

* cited by examiner

Primary Examiner—Duane Smith
Assistant Examiner—Jason M. Greene
(74) Attorney, Agent, or Firm—John VanOphem

(57) ABSTRACT

A weld chamber has an air intake and an exhaust or evacuating ductwork for evacuating gases and other particles from the welding chamber. The evacuating ductwork is connected to a vacuum source to remove gases and by products from the weld chamber during welding. A throttle plate is provided in the evacuating ductwork adjacent the weld chamber to adjust or regulate the air velocity evacuating from the weld chamber. The evacuating duct then leads to a sealed water filtering tank. All of the exhausted/evacuated gases and by products are led beneath the water line and bubble through the water before emerging from the sealed water. The soot and iron particles are immediately cooled and trapped in the water tank. Moreover, particles become wet and are less likely to become airborne thus leading to a substantial portion of the particles being trapped in the sealed water tank. Thee remaining gases are then evacuated to the vacuum source and further filtered by a mechanical filtration device.

7 Claims, 2 Drawing Sheets

WELDING FILTRATION SYSTEM

BACKGROUND OF THE INVENTION

1. Field of the Invention

The present invention is related to a weld soot filtration system and more particularly to a liquid filtration system for a laser welding process.

2. Summary of the Related Art

During a laser welding process by products are given off which must be evacuated from the vicinity of the weld. Specifically, iron particles within an argon based shielding gas environment are continuously produced during the laser process. Conventional evacuation systems provide a vacuum source proximate the laser weld vicinity. The vacuumed gasses are channeled to a paper or dry filtering system. Conventional systems utilize electrostatic filters, cleanable mechanical filters of fabric or other dry filtering material or a combination of both. These conventional systems are similar to simple air filtration systems to remove impurities from the air such as air conditioner filters. However, during the laser welding process argon gas is utilized to prevent oxidation from forming along the weld seem. As a result iron particles given off by the weld are not oxidized as they begin to cool due to the absence of oxygen in the immediate weld environment. The iron particles thus become highly reactive as a result of being shielded from oxygen. These particles retain heat as they build up in the evacuating ductwork. As a result the particles may start to smolder and eventually start a fire. Such is particularly of concern as soot becomes trapped in elbow turns in the evacuating ductwork. Consequently, these conventional systems require additional costly fire suppression systems. Moreover, the mechanical filtration systems require constant maintenance, cleaning and replacement.

The object of the present invention is to overcome and improve upon the drawbacks of the related art filtration systems.

SUMMARY OF THE INVENTION

The present invention is directed to a water filtration system for a laser welding process. A substantially closed weld chamber has an air intake and an exhaust or evacuating ductwork for evacuating gasses and other particles from the welding chamber. The evacuating ductwork is connected to a vacuum source to remove gasses and by products from the weld chamber during welding. A throttle plate is provided in the evacuating ductwork adjacent the weld chamber to adjust or regulate the air velocity evacuating from the weld chamber. The evacuating duct then leads to a sealed water filtering tank. All of the exhausted/evacuated gasses and by products (smoke, weld soot, etc. hereinafter referred to as "evacuants") are led beneath the water line and bubble through the water before emerging from the sealed water tank. The soot and iron particles are immediately cooled and trapped in the water tank. Moreover, particles become wet and are thus less likely to become airborne thus leading to a substantial portion of the particles being trapped in the sealed water tank. The remaining gasses are then evacuated to the vacuum source and further filtered by a mechanical filtration device.

DESCRIPTION OF THE PREFERRED EMBODIMENT

Figure 1:
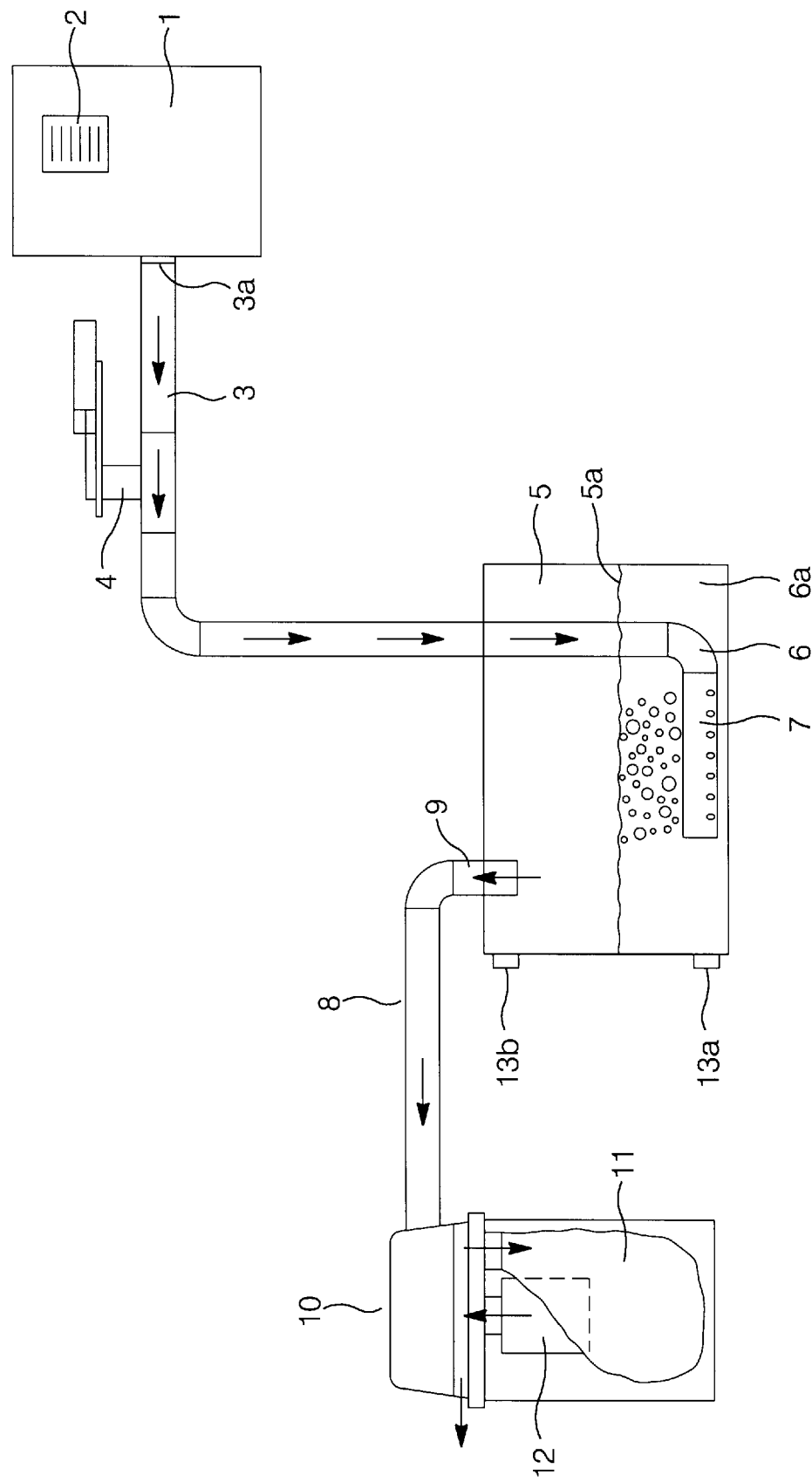
FIG. 1 is a schematic view of the filtration system according to the present invention.

Referring to FIG. 1, a conventional welding chamber 1 is provided for enclosing a laser welding process. An air vent 2 is provided to facilitate ingress of fresh air within the welding chamber during the welding process. An evacuating vent 3a is also provided for the egress of evacuants during the welding process. The evacuating vent 3a is in turn connected to a first evacuating duct 3 leading to an outlet 6. The outlet 6 is disposed within a sealed water filter tank 5 and submersed in water 6a below a water line 5a of the tank 5. The outlet 6 may also be connected to a baffle plate 7 that is submersed below the water line 5a. A second evacuating duct 8 connects the sealed water filter tank 5 to a vacuum source 10. An inlet 9 of the second evacuating duct 8 is disposed within the sealed water filter tank 5 and located above the water line 5a. A throttle plate 4 is provided to regulate the velocity of evacuants emerging from the welding chamber.

In the preferred embodiment the vacuum source 10 is a conventional wet-vacuum device including a paper bag filter 11 and a replaceable cartridge exhaust filter 12. A drain plug 13a and fill/vent plug 13b are provided for draining and filling the sealed water filter tank 5. However, the fill vent plug 13b could be located at the top of the tank to allow access to suck out water and contaminants. Fill plug 13b is adapted to be connected to a water source as is known in the art. The drain plug 13a is adapted to be connected to a drain hose or other ducting to direct contaminated water to a collection site. Both drain plug 13a and fill plug 13b create an airtight seal with the sealed water filter tank 5 when in the closed position.

During the laser welding process an argon shielding gas is used to prevent oxidation from forming on the weld seam. Iron particles and other by-products are given off during welding. It is desirable to vent the gasses and particles away from the welding chamber and provide a supply of fresh air. however, the iron particles become highly reactive as a result of not being oxidized as they are shielded from oxygen by the argon gas. The iron particles and other by-products retain significant heat as they build up in the evacuating ductwork. In conventional systems, the by-products can build in the ductwork and begin to smolder thereby causing fires.

According to the present invention, during the welding process vacuum source 10 is activated to draw evacuants from within the welding chamber 1. Consequently fresh air is drawn into the welding chamber 1 via air vent 2. Evacuants emerge from the evacuating vent 3a and through the first evacuating duct 3. The evacuants emerge from the first evacuating duct 3 through outlet 6 and baffle 7. The evacuants bubble through the water 6a within the sealed water filter tank 5. The contact of the evacuants with the water cools the gasses and iron particles to reduce any likelihood of fires. Moreover, the particles are wetted reducing the ability to remain airborne and thus remaining trapped in the sealed water filter tank 5. The gasses and any particles suspended therein are then fed to the vacuum source 10. A mechanical filter system is provided to remove any remaining particles or other undesirable portions of the evacuants that were not trapped within the sealed water tank 5. Specifically, the vacuum bag 11 and cartridge exhaust filter 12 are provided to filter the evacuants before discharging from the vacuum source 10.

The throttle plate 4 is used to regulate the velocity of evacuants emerging from the welding chamber 1. The throttle plate allows for a calibrated flow to be drawn from the welding chamber 1. When the welding process is concluded, the throttle plate 4 may be opened to a preset position to allow increased flow to quickly evacuate and replenish the welding chamber 1 with fresh air. However, during the welding process, such high velocity in the welding chamber may disturb the argon cover gas being used to prevent oxidation. In such an instance, the weld seam could become exposed to oxygen laden air and begin to oxidize and thereby weaken the weld seam. Therefore, during welding, the throttle plate 4 is adjusted to reduce the velocity of flowing evacuants to a desirable level to inhibit draw and prevent disturbance of the covering argon gas shield over the weld seam.

It is noted that the weld chamber 1 and connecting ducts 3,8 can me made of any suitable material as is known in the art. Moreover, the vacuum source 10 can be of any type so long as enough vacuum pressure is applied to the connecting ducts 3,8 to sufficiently draw off evacuants from the welding chamber 1 and through the water filter tank 5. However, the preferred embodiment contemplates the use of a conventional wet-vacuum device with a built in mechanical filtering device.

Figure 2:
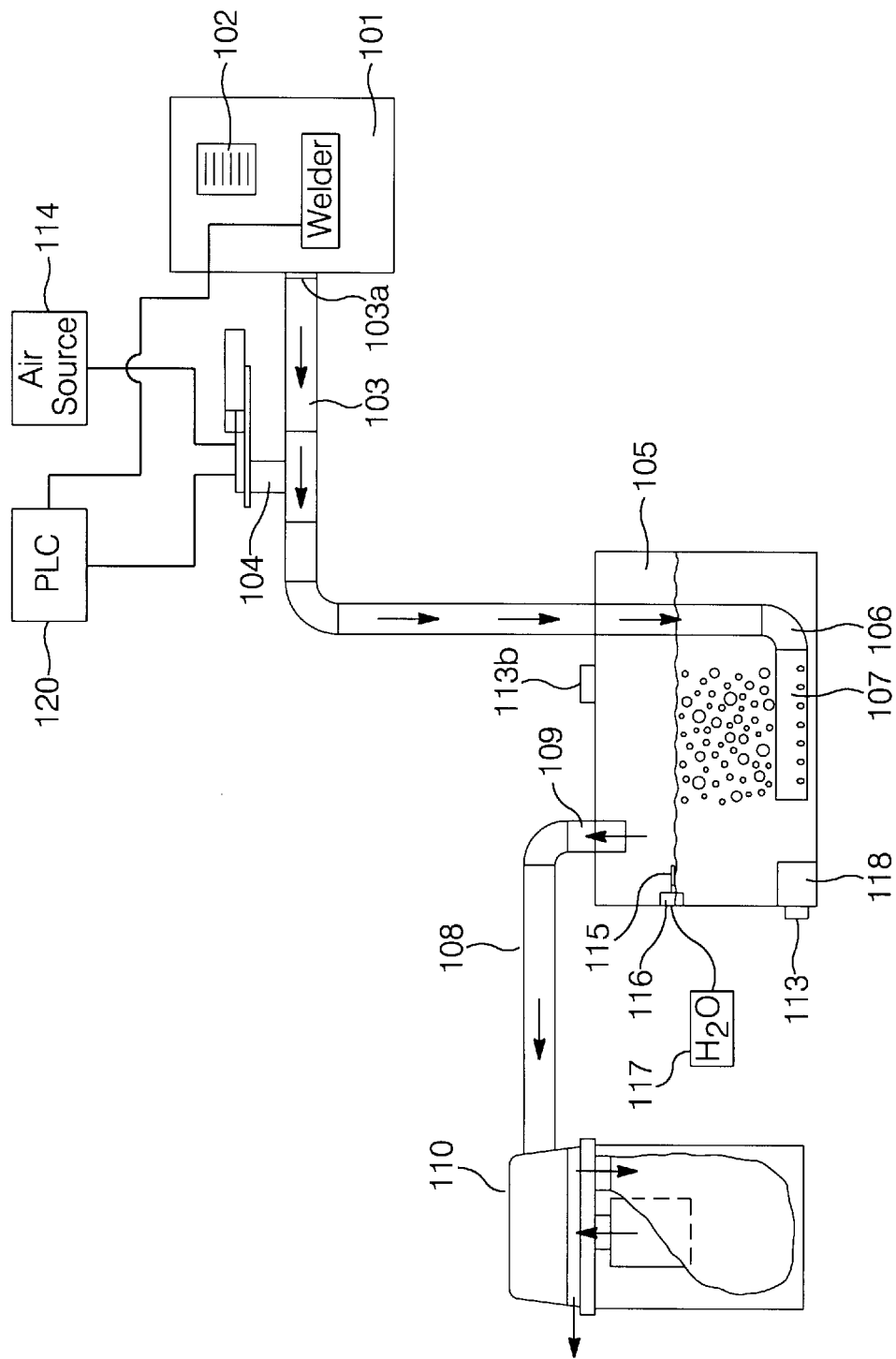
FIG. 2 is a schematic view of the filtration system according to an alternate embodiment of the present invention.

FIG. 2 depicts an alternate embodiment of the present invention. As in the embodiment of FIG. 1, a welding chamber 101 housing a welder and includes an air vent 102 and evacuating vent 103a. A first evacuating duct 103 connects the welding chamber 101 to a sealed water filter tank 105. An outlet 106 of the first evacuating duct 103 is submerged below the water line 105a and is connected to a baffle plate 107. A second evacuating duct 108 connects the water filtering tank 105 to the vacuum source 110. The second evacuating duct 107 has an inlet 109 disposed within the water filtering tank 105 significantly above the water line 105a. The embodiment of FIG. 2 differs from FIG. 1 in that the water filtering tank 105 is provided with an automatic filling and draining system and the throttle plate 104 is a pneumatically actuated electronically controlled device.

In order to automatically maintain the water level 105a at a predetermined level, the water filtering tank 105 is provided with an automatic filling system 116. The automatic filling system 116 includes a float valve 115. The float valve opens when the water level falls below a predetermined water level 105a. A water source 117 is connected to the filling system 116. When the water level 105a falls below a predetermined level, the float valve 115 opens and water flows from the water source 117 into the water filtering tank 105. Once the water level 105a reaches the desired level, the float valve 115 closes and the water source is shut off. The automatic drain system comprises a pump 118 for pumping contaminating water out of the water filter tank 105. A draining neck 113 is provided to direct contaminated water from the pump 118 to a collection site. An auxiliary fill/vent plug 113b is also provided for auxiliary fill access and to allow manual removal of water and entrapped contaminants.

The throttle plate 104 of the embodiment of FIG. 2 is pneumatically actuated. Therefore, the throttle plate 104 is connected to an air source 114 for actuation. A programmable logic control circuit 120 is connected to the throttle plate 104 to control the throttle plate 104 and thereby regulate the flow of evacuants emerging from the welding chamber 101. Preferably, the programmable logic controller 120 is connected to the welding mechanism. During welding, the PLC positions the throttle plate 104 such that the velocity of the flowing evacuants is reduced thereby inhibiting the likelihood of disturbing the argon shield around the weld seam. However, when the welding process has stopped, the PLC 120 opens the throttle plate 104 to allow higher velocity and maximum flow to quickly evacuate the welding chamber 101 and replenish with fresh air. Once the welding chamber 101 has been fully replenished, the throttle plate 104 may be fully closed and the vacuum source 110 terminated.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims. For example, while water has been identified as the preferred liquid to filter and cool the contaminants, it is contemplated that other liquids may be employed. Such use of other liquids falls within the spirit and scope of the present invention.

What is claimed is:

1. A welding filtration system comprising:

a welding chamber having an air vent and an evacuation vent;

a sealed filter tank having liquid contained therein;

a first evacuating duct connecting said evacuation vent of said welding chamber to said sealed liquid filter tank, said first evacuating duct having an outlet submersed in said liquid and substantially below a liquid line of said filter tank;

a second evacuating duct connecting said sealed tank to a vacuum source, said second evacuating duct having an inlet connected to said sealed filter tank and positioned above said liquid line, said vacuum source being provided to draw evacuants from said welding chamber through said first and second connecting ducts and through said liquid, said liquid being provided to cool said evacuants and trap at least a portion thereof within said sealed filter tank; and, a throttle plate disposed between said filter tank and said welding chamber, said throttle plate being provided to regulate a velocity of said evacuants emerging from said welding chamber.

2. The welding filtration system according to claim 1, said system further comprising an air source connected to said throttle plate for pneumatically operating said throttle plate.

3. The welding filtration system according to claim 1, wherein said throttle plate is connected to a programmable logic controller adapted to control and regulate said throttle plate.

4. The welding filtration system according to claim 2, wherein said throttle plate is connected to a programmable logic controller adapted to control and regulate said throttle plate.

5. A method of filtering by-products in a laser welding process, said method comprising the steps of:

providing a welding chamber surrounding the vicinity of said laser process, said welding chamber having an air vent;

providing a vacuum source to said welding chamber and drawing off evacuants from with said welding chamber;

directing said evacuants emerging from said welding chamber to a filter tank and forcing said evacuants through a liquid contained therein; and inhibiting a draw of air into said air vent to thereby regulate a velocity of said evacuants emerging from said welding chamber during said laser welding process thereby preventing disturbance of cover gasses immediately adjacent a weld area.

6. The method of filtering by products in a laser welding process according to claim 5, said method further comprising the step of:

automatically maintaining said liquid within said filter tank at a predetermined level.

7. The method of filtering by products in a welding process according to claim 5, wherein said liquid is water.

* * * * *